United States Patent [19]

Kotani et al.

[11] Patent Number: 5,101,427
[45] Date of Patent: Mar. 31, 1992

[54] COMMUNICATION APPARATUS CONNECTED TO ISDN

[75] Inventors: Takashi Kotani, Tokyo; Naoto Kagami, Yokohama, both of Japan

[73] Assignee: Canon Kabushiki Kaisha, Tokyo, Japan

[21] Appl. No.: 732,360

[22] Filed: Jul. 18, 1991

Related U.S. Application Data

[63] Continuation of Ser. No. 436,254, Nov. 14, 1989, abandoned.

[30] Foreign Application Priority Data

Nov. 16, 1988 [JP] Japan .................................. 63-287596
Jan. 23, 1989 [JP] Japan ...................................... 1-14651

[51] Int. Cl.⁵ ............................................. H04M 11/00
[52] U.S. Cl. ....................................... 379/100; 379/355
[58] Field of Search ............... 379/100, 142, 93, 355, 379/96, 98, 94; 370/110.1

[56] References Cited

U.S. PATENT DOCUMENTS

| | | | |
|---|---|---|---|
| 4,672,662 | 6/1987 | Nishino et al. ...................... 379/277 |
| 4,825,461 | 4/1989 | Kurita et al. ........................ 379/100 |
| 4,864,601 | 9/1989 | Berry ..................................... 379/96 |
| 4,901,343 | 2/1990 | Yamaguchi ........................ 379/100 |
| 4,908,851 | 3/1990 | Kotani et al. ......................... 379/96 |

*Primary Examiner*—James L. Dwyer
*Assistant Examiner*—Ahmad F. Matar
*Attorney, Agent, or Firm*—Fitzpatrick, Cella, Harper & Scinto

[57] ABSTRACT

In a communication apparatus connected to an ISDN and having a telephone function, the arrangement is such that when a call is received from another party's facsimile machine, the number of the sending party received is stored in memory. When depression of a communication start switch by the operator is detected during communication by facsimile, a call is made by telephone based on the stored sending party's number. When a call is made to the other party's fdacsimile machine, the other party's dial number is stored. If it is detected that the operator has taken a handset off the hook during communication by facsimile, a call is made by telephone based on the other party's dial number that has been stored.

11 Claims, 8 Drawing Sheets

COMMUNICATION APPARATUS CONNECTED TO ISDN

This application is a continuation of application Ser. No. 07/436,254 filed Nov. 14, 1989 now abandoned.

BACKGROUND OF THE INVENTION

1. Field of the Invention

This invention relates to a communication apparatus connected to an ISDN and capable of making a call with a function having a different attribute during communication.

2. Description of the Prior Art

An ISDN (integrated service digital network) has recently been developed as a digital transmission circuit network to make possible a communication service for transmission of images, voice and various other types of information.

With such an integrated service network, a plurality of transmission channels are available. A plurality of terminals such as G4 facsimile machines can be connected to a single subscriber's line, and two or more of these terminals can be operated simultaneously on the user side.

More specifically, in an ISDN, there are two information channels (B channels), which can be used simultaneously. This makes it possible for the user to carry on a telephone conversation while using a facsimile machine (FAX). In such case, the other party on the telephone can also make such simultaneous use of the FAX and telephone to converse while communicating by facsimile.

In a FAX transmission, there are cases where it is desired to contact the sender of a document to verify its contents during reception of the document from the sending party, or where it is desired to supplement a document during transmission of the document to the other party. At such times, the practice in the prior art is for the operator to place a call just as in the case of an ordinary telephone in order to deal with the situations mentioned above. When it is desired to contact the facsimile communicating party during a FAX transmission, so-called dialing (inclusive of push-button operation) is performed during the transmission.

Further, in an ISDN, there are cases where a "change-of-service" function is available, in which an attribute is changed (e.g., from image to voice) without disconnecting the call to the other party's machine during a transmission. With an ISDN having this function, it is possible for voice data to be transmitted following the completion of an image data transmission. U.S. Pat. No. 4,995,073 is directed to an invention employing this change-of-service function. However, in order to carry out a separate transmission during the transmission of data, dialing is necessary even if the change-of-service function is used.

Figure 6:
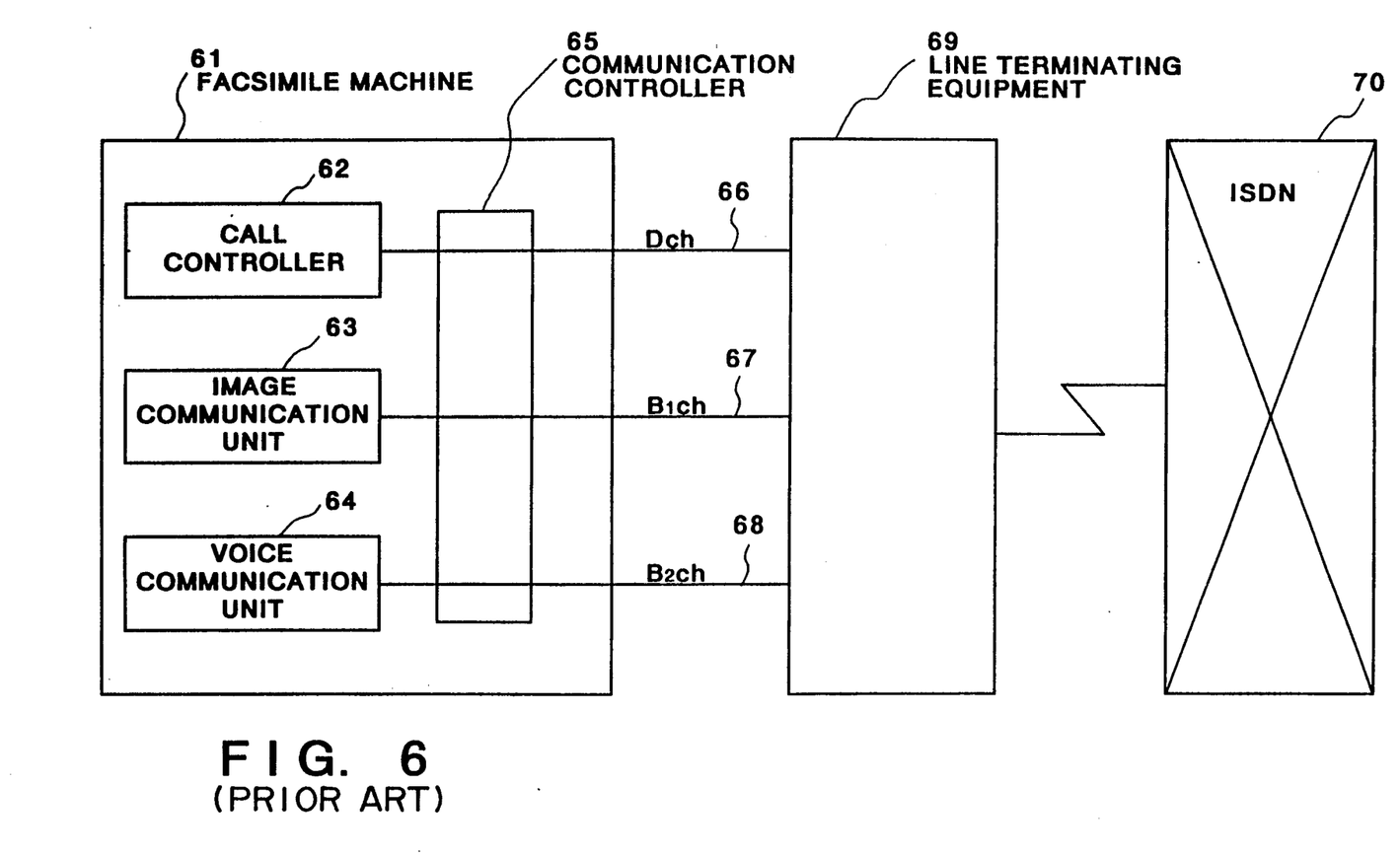
FIG. 6 is a block diagram for describing communication processing according to an example of the prior art.

Reference will now be had to FIG. 6 to describe a case where a facsimile machine having a telephone function is connected to the abovementioned ISDN to transmit image information on one "B channel" thereof, during which time the other "B channel" is used for a simultaneous telephone conversation.

As shown in FIG. 6, a facsimile machine 61 comprises a call controller 62, an image communication unit 63, a voice communication unit 64 and a communication controller 65. These are connected to an ISDN 70 via line terminating equipment 69. The communication controller 65 controls the data link with the ISDN 70 in accordance with the data link control procedure of the ISDN 70. The call controller 62 administers an incoming/outgoing call protocol to control a "D channel" (Dch) 66 via the communication controller 65. After a call is connected, the image communication unit 63 controls the sending and receiving of image data on, e.g., a "B channel" (B1ch) 67 in accordance with a facsimile transmission procedure. The voice communication unit 64 controls the sending and receiving of voice data on another "B channel" (B2ch).

When the image communication unit 63 is sending or receiving image data on B1ch 67 in the facsimile machine 61 constructed as set forth above, a call procedure must be executed by the call controller 62 if a telephone call is to be made to the other party involved in the communication. If the call is connected, voice data is transmitted on B2ch 68 from the voice communication unit 64 and a conversational state is established.

However, if the communication mode is, say, the reception mode in a case where it is desired to place a telephone call to the same party presently involved in a FAX transmission, a telephone conversation with the sender of the image data cannot take place unless the number of this sending party is entered, irrespective of the fact that the number of the sending party is being received when the call is connected. This is inconvenient. In addition, if the communication mode is the sending mode, it is necessary to dial the same number again even though the other party's number has already been entered in accordance with the transmission procedure. As a result, the calling operation performed by the operator takes time.

Furthermore, if the other party's telephone number is unknown when data is being received from the other party, the operator must take the trouble to look up the number. Moreover, since the act of dialing in the number depends upon the operator, errors are easily made and the wrong number may be dialed.

SUMMARY OF THE INVENTION

An object of the present invention is to provide a communication apparatus in which, during communication with another party's apparatus, communication with the other party can be performed with a different attribute through a simple operation.

Another object of the present invention is to provide a communication apparatus in which the burden on the operator can be alleviated by simplifying the calling operation.

Still another object of the present invention is to provide a communication apparatus in which, during transmission of image data on one channel of an ISDN, a call can be placed to the same party by a single touch, thereby making it possible to perform voice data communication with the party on another channel.

A further object of the present invention is to provide a communication apparatus in which, even if an ISDN does not possess a change-of-service function, communication can be performed with the same party upon changing an attribute.

Other objects of the present invention will become clear from the accompanying drawings and the detailed description to follow.

DESCRIPTION OF THE PREFERRED EMBODIMENTS

Preferred embodiments of the present invention will now be described in detail with reference to the accompanying drawings.

Figure 1A:
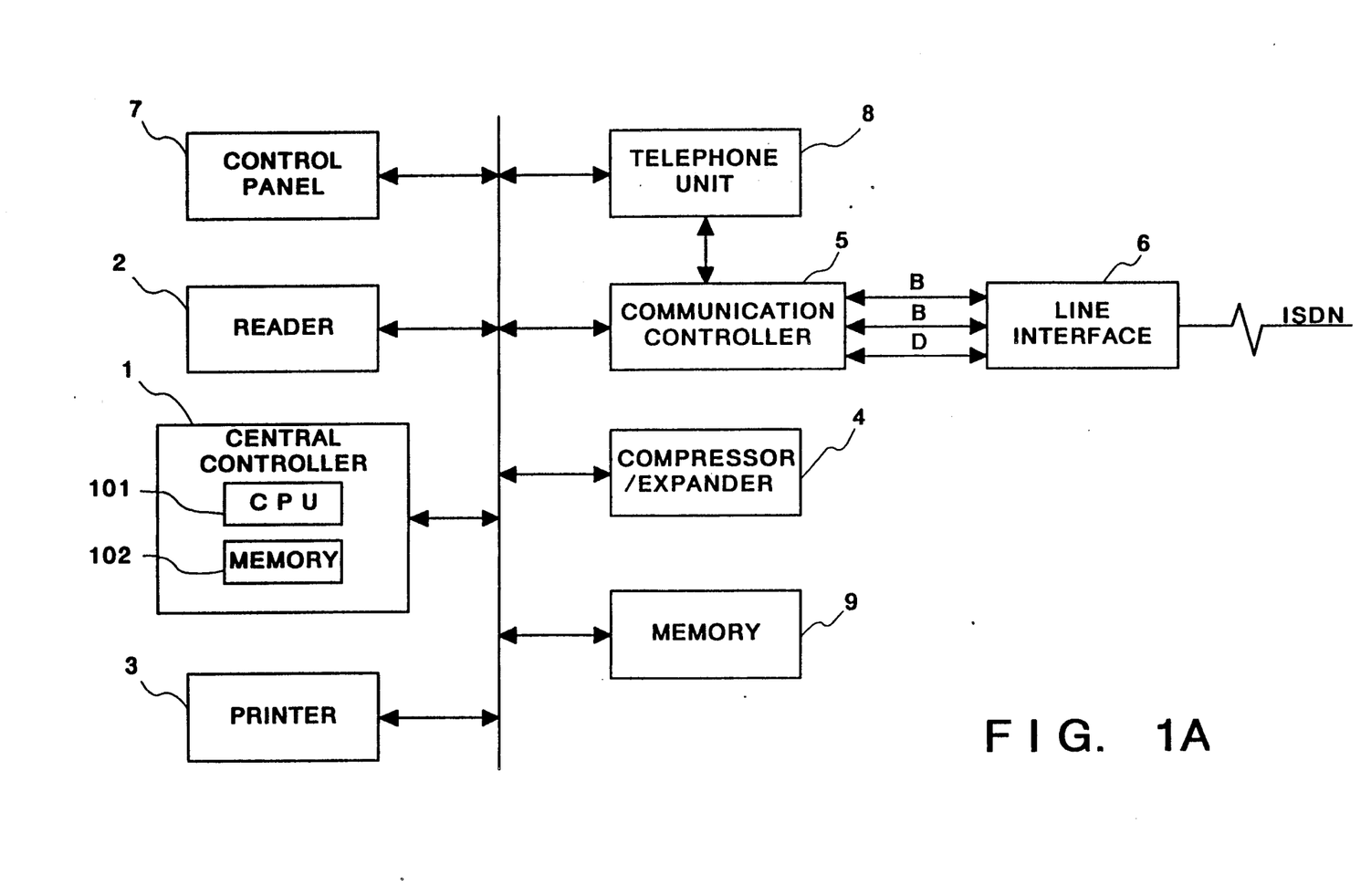
FIG. 1A is a block diagram showing the construction of a facsimile machine according to the present embodiment.
Figure 1B:
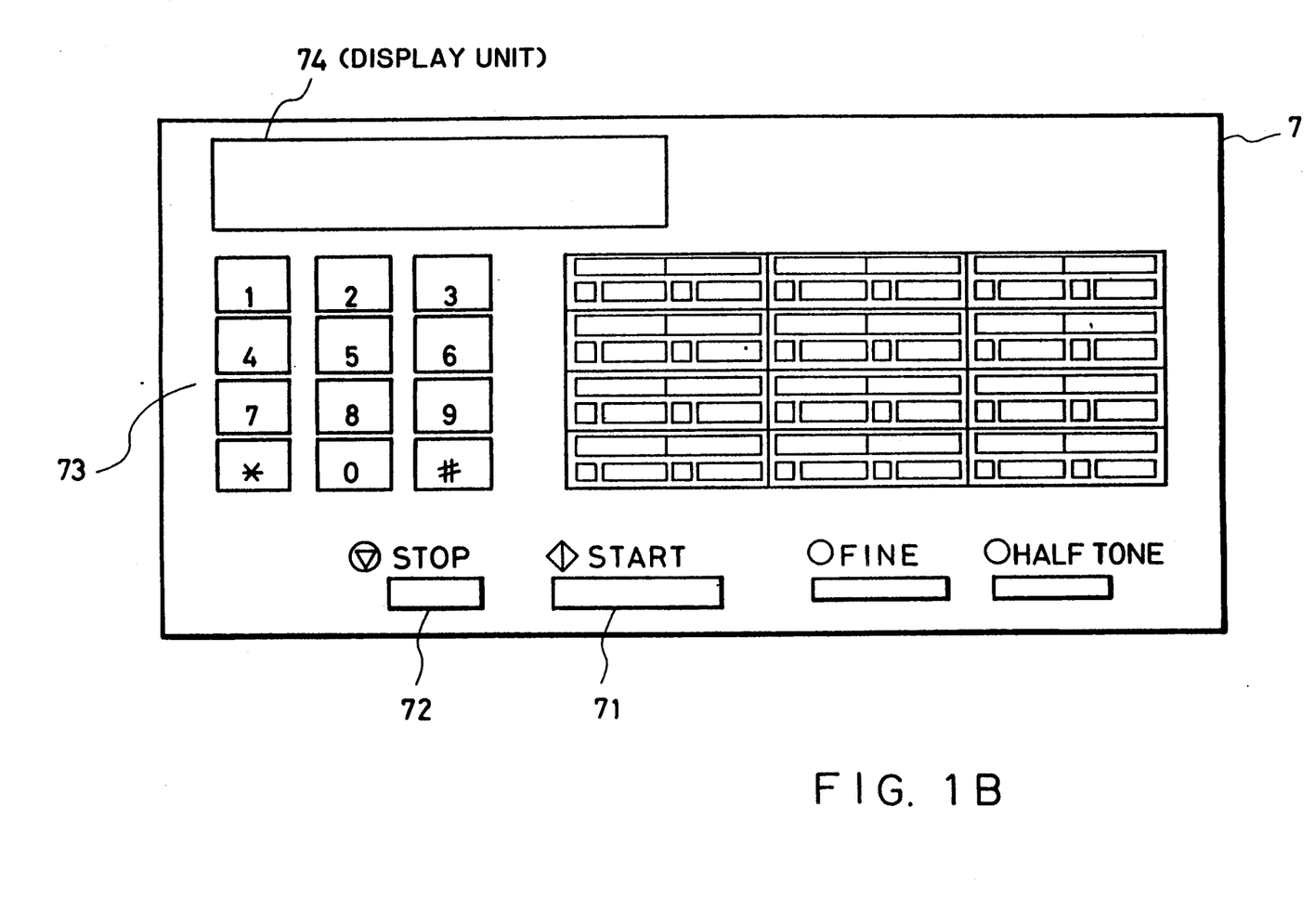
FIG. 1B is a view showing the external appearance of a control panel on the facsimile machine of FIG. 1A.

DESCRIPTION OF THE APPARATUS (FIGS. 1A, 1B)

FIG. 1A is a block diagram showing a G4 facsimile machine connected to an ISDN in accordance with an embodiment of the present invention.

The present G4 facsimile machine is one having a telephone function. As shown in FIG. 1A, a central controller 1 includes a CPU 101 for controlling the overall apparatus in accordance with a program described below, and a memory 102 which stores the program of the CPU 101. Connected to the central controller 1 are a reader 2 for reading a document to be transmitted, a printer 3 for printing out the received document, and a compressor/expander 4 for compressing or expanding an image. At the time of transmission, the reader 2 reads the transmitted document and outputs original image data. The outputted original image data is encoded and compressed by the compressor/expander 4 and then sent to the ISDN line.

Since the communication apparatus is a G4 facsimile machine for an ISDN in this embodiment, encoding is performed in accordance with the G4 transmission conventions.

The compressor/expander 4 performs compression at the time of transmission and expansion of received image information at the time of reception. The printer 3 has a recording mechanism and is adapted to describe an original image on recording paper on the receiving side using image data inputted in page units, namely image data that has been decoded and expanded. The recording mechanism may be of any suitable type, such as a thermal recording-type or laser beam-type recording mechanism.

As set forth above, sending and receiving are carried out via the communication controller 5, which acts through a line interface 6. The communication controller 5 performs control of communication, which includes facsimile communication and conversation by telephone, described below.

The line interface 6 is for interfacing the ISDN. The communication controller 5 is connected to an ISDN subscriber's line via the line interface 6. Control of the B channels and a D channel in accordance with the ISDN protocol is thus carried out.

At the time of facsimile reception, the communication controller 5, under the control of the central controller 1, executes end-to-end communication with the facsimile terminal of another party, as well as control of transfer of the aforementioned received image information to the compressor/expander 4. Similarly, under the control of the central controller 1, the line interface 6 executes a predetermined incoming call procedure at the time of an incoming call from the network side.

In addition to the reader 2 and printer 3, the present apparatus includes a control panel 7 for operating the apparatus, a telephone unit 8 for carrying on a telephone conversation, and a memory unit 9 for storing the number of a calling party.

The control panel 7 is provided with various switches manipulated by the operator. The switches of the control panel 7, whose external appearance is illustrated in FIG. 1B, include switches that would be used for operating any common facsimile machine, such as a communication start key 71 and stop key 72.

Since the present apparatus possesses a telephone function, use is made of a ten-key pad D3, namely a dial keys, for inputting a party's telephone number. The control panel 7 is also provided with a display 74 for displaying various information.

At the time of facsimile reception, the memory unit 9 is used in order to store the number of the party involved in the facsimile communication, namely the number of the sender. This is done in response to arrival of an incoming call.

In the present embodiment, the memory unit 9 is provided as means for storing the number of the sending party, as set forth above. Further, means is provided which will automatically call the other party when a call is placed without keying in the number using the dial keys 73 on the control panel 7 (i.e., when a call is placed by pressing the start key 71). By adopting such an arrangement, a telephone conversation can be had with the sending party, as for the purpose of verifying the document being received, without keying in the sending party's number when the sending party is called.

Figure 2:
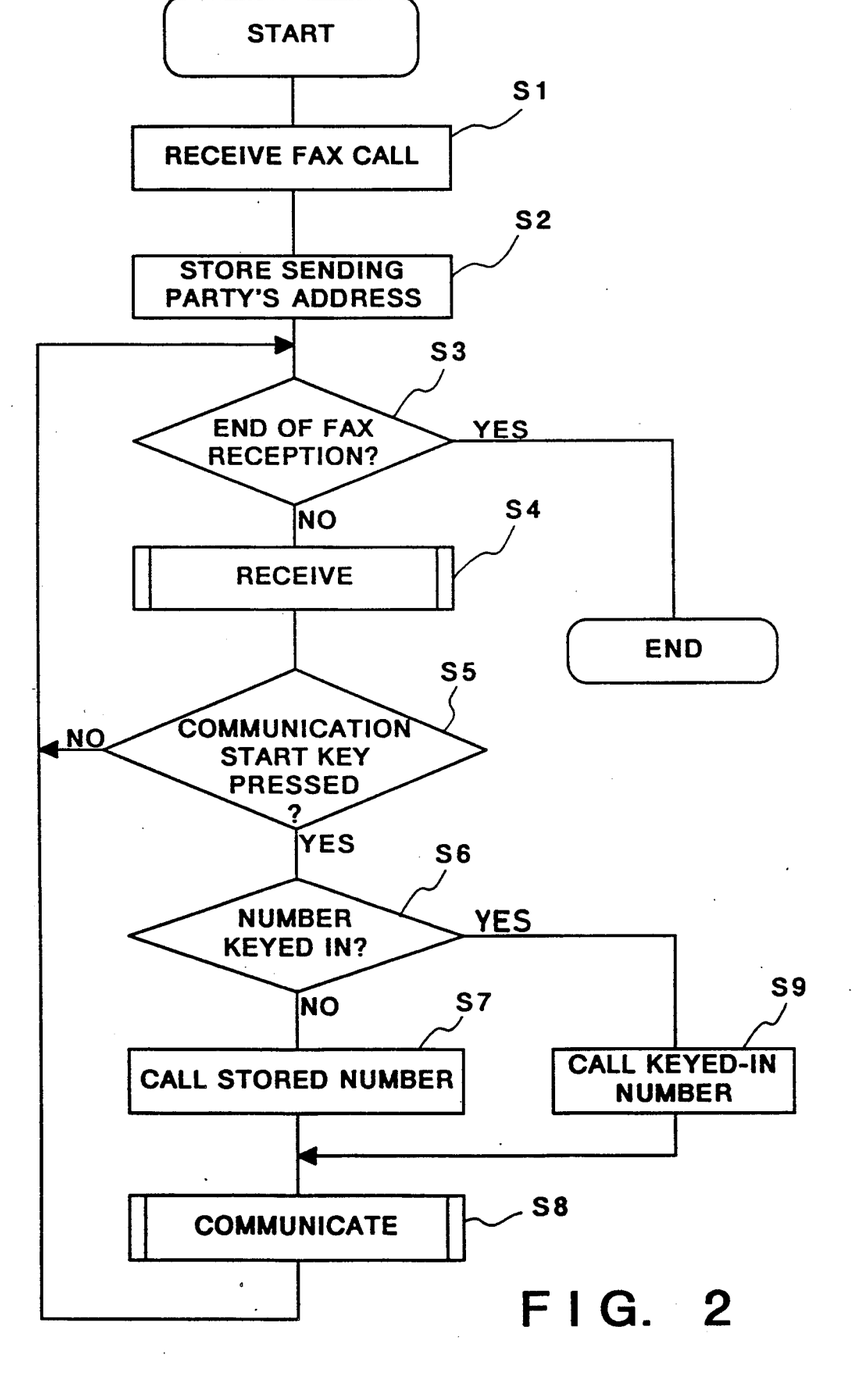
FIG. 2 is a flowchart showing calling processing during reception in the present embodiment.

To this end, a processing procedure (program), an example of which is shown in FIG. 2, is stored beforehand in the memory 102, which is the program storing section of the central controller 1. As will be described below, this program is adapted to effect control in such a manner that a sending party's number is stored during reception with the facsimile machine, and such that when the sending party's number is called by pressing the start key 71 but without keying in the number, the call will be placed by means of the stored sending party's number. Based on the information stored in the memory unit 9, which is for storing the sending party's number, and such information as whether or not the communication start key 71 and dial keys 73 on the control panel 7 have been pressed or not, the CPU 101 executes the control program and thus controls the operation of the communication controller 5, etc.

DESCRIPTION OF PROCESSING PROCEDURE (FIG. 2)

The invention will now be described in further detail with reference also to FIG. 2.

FIG. 2 is a flowchart illustrating a processing procedure executed in the facsimile machine of the present embodiment in order to place a call by telephone during reception from another party's machine.

When there is an incoming call from the other party's facsimile machine via the ISDN subscriber's line in FIG. 1, facsimile incoming processing is executed at step S1, as shown in FIG. 2.

In other words, in response to an incoming call from the network side, the line interface 6 executes an incoming-call procedure. Next, the sending party's number received by the communication controller 5 using the D channel is stored in the memory unit 9 (step S2). More specifically, the sending party's address, which arrives via the ISDN subscriber's line, is stored in the memory unit 9. By thus saving the sending party's number each time there is an incoming call, call processing will be executed based on the stored number if it should be necessary to carry on a telephone conversation with the sending party during reception of a document or the like.

Reception processing starts to be executed in the usual manner once the processing for storing the sending party's number has been performed. That is, at completion of the incoming-call procedure, the communication controller 5 performs end-to-end communication with the other party's facsimile machine using one of the B channels and transfers the received image information to the compressor/expander 4. The image information expanded by the compressor/expander 4 is then transferred to the printer 3, where the information is printed out (steps S3, S4). In the course of the foregoing operation, it is determined at step S3 whether reception has ended. Reception processing is executed at step S4 until it is determined that reception has ended. In this example of the program, monitoring is performed (step S5) at all times to determine whether the communication start key 71 on the control panel 7 has been pressed during reception.

If the decision rendered at step S5 is NO, the program returns to the step S3. If the decision rendered at step S3 is NO, then the program proceeds to step S4 to continue reception. Thus, if the operator does not press the communication start key 71 while reception continues following the arrival of the incoming facsimile call, the present apparatus performs ordinary facsimile reception processing. When facsimile reception ends, execution of the present program is terminated.

If, during the aforementioned reception, it becomes necessary for the receiving side to verify with the sending party the contents of the received document, the operator on the receiving side performs the following operation: Specifically, when the operator wishes to converse with the sending party regarding the transmitted document, the operator presses the communication start key 71 without keying in the number of the sending party.

The status of the communication start key 71 is monitored at step S5, as mentioned above. Therefore, when the communication start key 71 is pressed during reception and YES is rendered as the decision at step S5, the program proceeds to steps from step S6 onward so that the processing described below is executed, as a result of which the party presently sending the document is called automatically.

When the communication start switch 71 on the control panel 7 is pressed and this is recognized by the central controller 1 (YES at step S5), it is then determined at step S6 whether a number has been keyed in. As mentioned above, it is assumed that the operator merely presses the communication start key 71 and does not key in the sending party's number by the dial keys 73. Therefore, when the program proceeds from step S5 to step S6, the decision rendered at step S6 is NO.

Thus, depression of the communication start key 71 is recognized by the central controller 1 (step S5), and then the fact that the sending party's number has been called without keying in the number is recognized (step S6). In other words, it this case it is judged that the operator, of his own volition, has requested to make the call based on the sending party's number stored in the memory unit 9; hence, the stored number is called. More specifically, the central controller 1 reads out the sending party's number stored in the memory unit 9 at step S2, transfers the number to the communication controller 5 and issues a command to call the sending party's number. Then, in accordance with this command, the communication controller 5 executes the call to the sending party's number by means of the D channel (step S7), and communication is performed by the telephone unit 8 (step S8). Processing then returns to step S3.

Thus, as described above, the facsimile machine equipped with a telephone function has the memory unit 9 for storing the number of the communicating party, and means for calling the communicating party's number, which is stored in the memory unit 9, without the operator keying in the number. When the communicating party has been called without keying in the party's number during reception by facsimile, the call is placed to the communicating party. As a result, the call operation can be performed merely by pressing the communication start key 71, without operating the number dialing keys. Thus, when the sending party's number is stored during reception in the facsimile mode and a called is placed to this party during reception without keying in the party's number, the party's number can be called, without being keyed in, by providing means for making the call using the stored number of the sending party. With regard to a call made during reception of a document or the like, the operator is capable of calling the sending party simply and correctly without the need of determining who the sending party is.

With this program, the operator himself is capable of actually keying in the other party's number to telephone the party. Specifically, if the decision rendered at step S6 is YES, that is, if the number has been keyed in, the call to the keyed in number is executed (step S9), so that the call is placed to this number.

In accordance with this embodiment, a call can be placed without inputting the other party's number, as is required in the prior art. As a result, operation is simplified and the time required for the operation is curtailed. Moreover, telephoning the wrong number is eliminated.

In the present embodiment, an example has been described in which the telephone of a party sending image data is called during the reception of the data from this party. However, the embodiment can be employed in the same manner also in a case where the same party is called during the transmission of image data to the party. Furthermore, in the present embodiment, the example described is one in which a call for communication by voice is made during the communication of image data. However, the present invention is applicable also in a case where image data is transmitted by pressing the communication start key during voice communication.

Second Embodiment

A second embodiment of the present invention will now be described in detail with reference to the drawings.

In the foregoing embodiment, an example is described in which a call is made during a data transmission by pressing the communication start key. In this embodiment, however, a case will be described in which a call is made to the same party during a data transmission by lifting the handset of the telephone from the hook.

Figure 3:
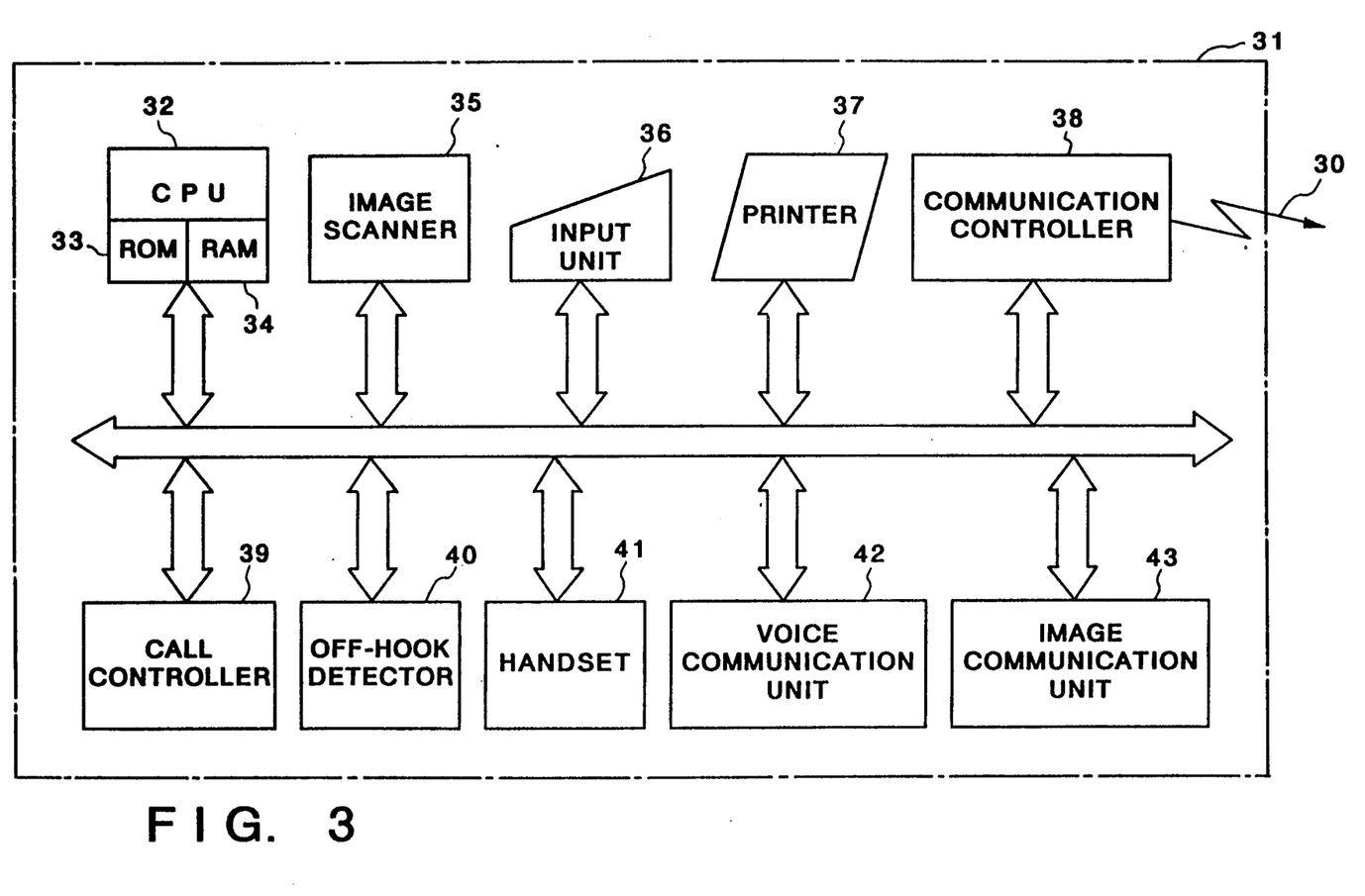
FIG. 3 is a block diagram showing the construction of a facsimile machine according to a second embodiment.

DESCRIPTION OF THE APPARATUS (FIG. 3)

FIG. 3 is a block diagram showing the construction of a facsimile machine 31 embodying the present invention.

As shown in FIG. 3, a controller is constituted by a CPU 32 for controlling the overall machine 31, a ROM 33 for storing a control procedure (program) described below, and a RAM 34 utilized as a work area employed when the CPU 32 executes processing and as a temporary saving area for flags or the like when the CPU 32 executes error processing. The controller corresponds to the central controller 1 of FIG. 1. An image scanner 35 which reads in, in the form of an image, input information indicative of a manuscript or the like, an input unit 36 having buttons or the like for entering information, such as a destination, at the time of a transmission, and a printer 37 for printing an image on recording paper correspond to the reader 2, control panel 7 and printer 3, respectively, of FIG. 1.

In this embodiment, a communication controller 38 connected to an ISDN line 30 and a call controller 39 which controls protocol when calls are made and received correspond to the communication controller 5 and line interface 6, respectively, of FIG. 1. An off-hook sensor 40 for sensing when a handset 41 is taken off the hook and hung up, and a voice communication unit 42 which codes and decodes a voice to administer voice communication with external equipment are units which function in the same manner as the telephone unit 8 of FIG. 1. An image communication unit 43 codes image information read by the image scanner 35, decodes image information that arrives from external equipment and administers image communication with the external equipment. The image communication unit 43 has a function the same as that of the compressor/expander 4.

Figure 4:
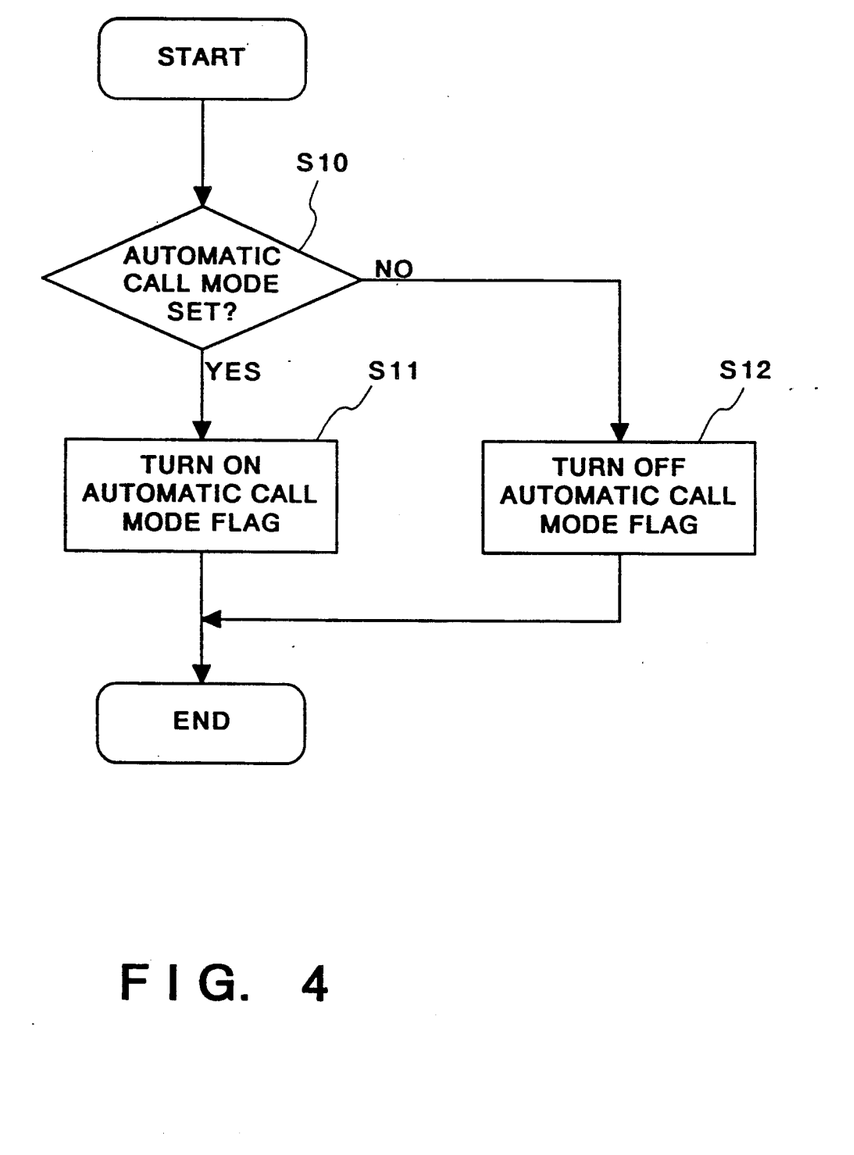
FIG. 4 is a flowchart showing automatic call setting processing in the second embodiment.
Figure 5A:
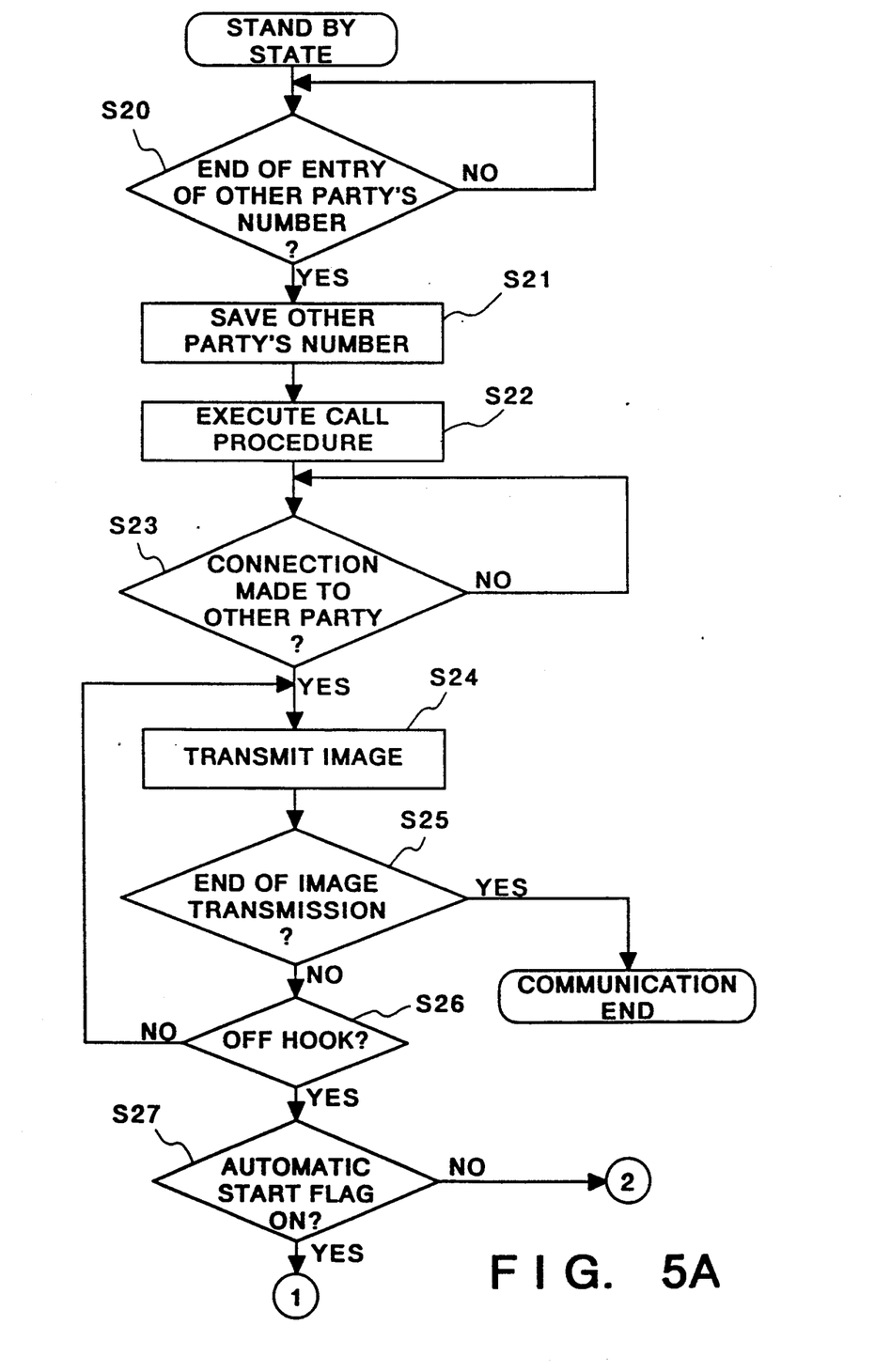
FIG. 5A and 5B are flowcharts showing calling processing during transmission in the second embodiment.
Figure 5B:
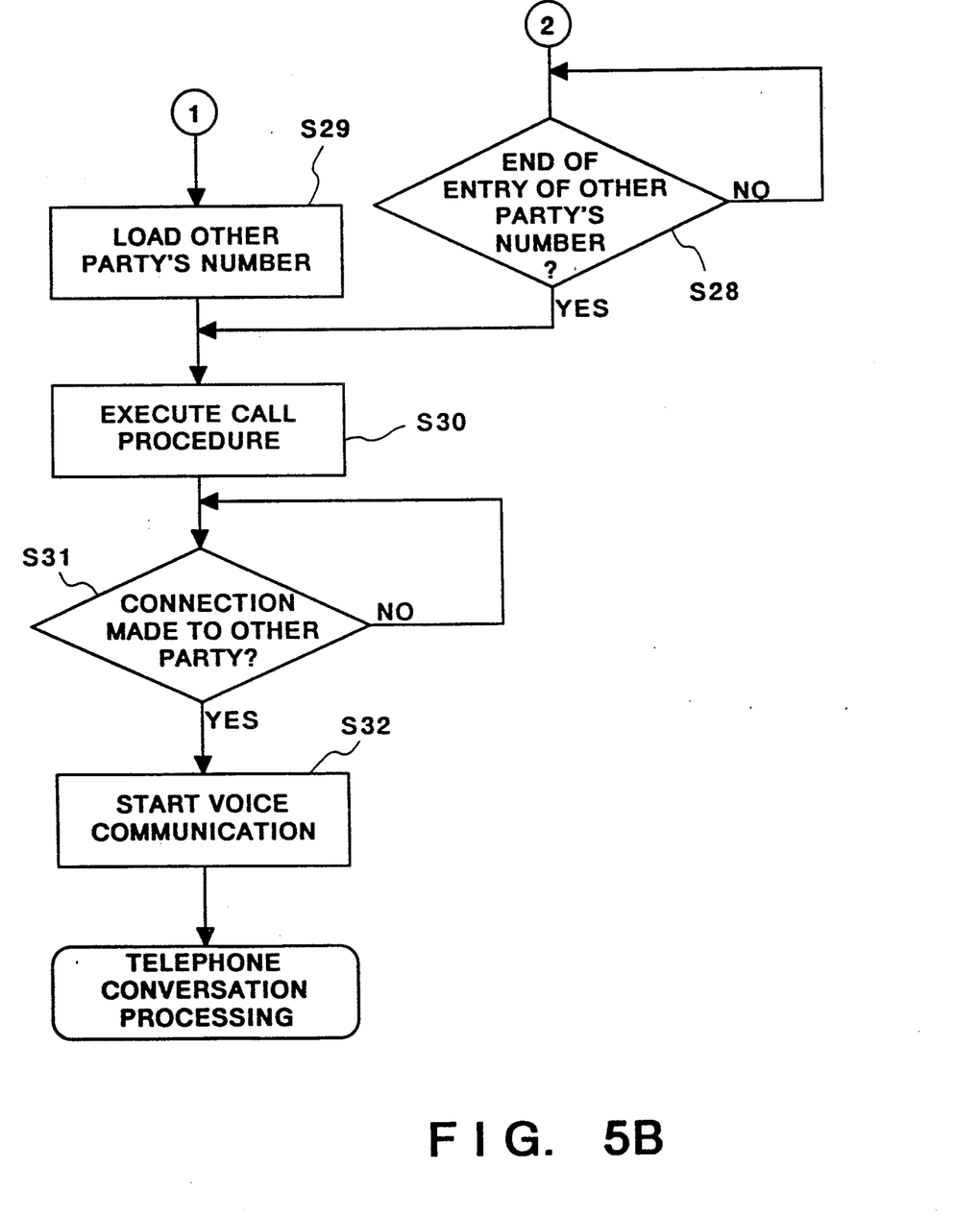

DESCRIPTION OF CONTROL PROCEDURE (FIGS. 4, 5A, 5B)

The control procedure of the facsimile machine 31 constructed as set forth above will now be described in accordance with the flowcharts shown in FIGS. 4, 5A and 5B.

According to this embodiment, when the telephone handset is taken off the hook during transmission of an image, this enables an automatic call mode for automatically calling the communicating party to be set by a key or switch on the input unit 36. FIG. 4 is a flowchart illustrating processing for setting/cancelling the automatic call mode.

First, if a key input for setting or cancelling the automatic call mode is made by the operator before the operator lifts the handset from the hook prior to or during image transmission following the introduction of power, the key input is discriminated at step S10. If the result of the discrimination is that a set key has been pressed ("YES" at step S10), the program proceeds to step S11, at which an automatic call flag defined beforehand in the RAM 34 is turned "ON". If the result of the discrimination is that a cancel key has been pressed ("NO" at step S10), however, the automatic call flag is turned "OFF" at step S12.

Processing for placing a call in response to the operator's raising the handset from the hook during image transmission will now be described in accordance with the flowcharts shown in FIGS. 5A and 5B.

First, as step S20, the system waits for the operator to dial in the number of the party to which the transmission is directed. This is done at the time the image is transmitted. When the dial input from the input unit 36 is concluded, processing proceeds to step S21, at which the information indicative of the other party's number entered from the input unit 36 is saved in a sending number area of the RAM 34. Next, at step S22, the call controller 39 is instructed to carry out call processing, after which completion of connection from the call controller 39 is awaited at step S23. When the call controller 39 which has received this instruction places a call to the other party via the communication controller 38 and receives a connection signal from the ISDN line 30 in accordance with the communication procedure, it informs the CPU 32 of the fact that the connection has been completed. When the connection ends, the image communication unit 43 is started at step S24 to begin the image transmission.

The transmitted image is read in by the image scanner 35 and converted into image data. The image data is transferred to the image communication unit 43, at which coding processing is performed. When coding processing ends, transmission in accordance with a facsimile procedure starts via the communication controller 38.

It is detected at step S26 whether the handset 41 has been taken off the hook, which state represents a call request by telephone. If the off-hook state is detected during image transmission (step S25) and a detection signal enters from the off-hook detector 40, the program proceeds to step S27. However, if there is no call request, image transmission is executed at step S24 until end of transmission from the image communication unit 43 is detected step S25. When end of the image transmission is discriminated, processing proceeds to a communication ending procedure and image communication processing is terminated.

If a call is made, it is determined at step S27 whether, the automatic call flag set earlier is "ON" or "OFF". If the flag is found to be "ON", processing proceeds to step S29 (FIG. 5B). Here the information indicative of the other party's number is fetched from the sending number area of RAM 34 and the information is loaded in the call controller 39. Processing then proceeds to step S30, at which the call procedure is executed by instructing the call controller 39 to call the other party's number. This is followed by step S31, at which a connection-completion signal is awaited from the call controller 39. When the connection has been made, processing proceeds to step S32, at which voice communication by means of the voice communication unit 42 is started. It should be noted that image communication at steps S24 through S26 and voice communication at steps S27 through 32 are executed in parallel fashion.

If the automatic call flag is not "ON" at step S27, operator input of information indicating the other party's number is awaited and ordinary input processing is performed. Thereafter, when the dial input from the input unit 36 ends, the program proceeds to step S30, the above-described call procedure is started and the foregoing voice communication is started.

In accordance with this embodiment, in a case where voice communication is performed on one "B channel" (B2ch) during a transmission performed on the other "B channel" (B1ch) in the facsimile machine equipped with a telephone function and connected to the ISDN, the operator need not repeat the same dialing owing to provision of calling means which issues a call to the same party merely by the operator's taking the handset off the hook. This makes its possible to simplify the calling operation and lighten the burden on the operator.

Further, in this embodiment, if the handset is taken off the hook during transmission of an image, the automatic call mode for automatically calling the same party by unhooking the handset is set by a key or switch on the input unit 36. However, it is permissible to adopt an arrangement in which a timer is monitored for a predetermined period of time after the handset is unhooked, with a transition being made to the automatic call mode if the other party's dial number is not entered within the predetermined time period.

Though the present invention has been described based on preferred embodiments thereof, the invention is not limited to these embodiments but can be modified in various ways within the scope of the claims.

In accordance with the present invention as described above, the calling operation during communication is simplified, thereby making it possible to lighten the burden on the operator and eliminate the dialing of wrong numbers.

What is claimed is:

1. A communication apparatus connected to one subscriber's line of an integrated service digital network having a first information channel, a second information channel, and a control channel, and having a first communication function and a second communication function, comprising:
   a handset;
   a communication start switch;
   first communication means for performing communication with another party's communication apparatus by said first communication function using said first information channel;
   memory means for storing information indicative of a number for discriminating another party's communication apparatus when a call is received or a call is made by the first communication means;
   detecting means for detecting a call request by depression of said communication start switch or when said handset has been taken off a hook during communication by the first communication means;
   call means for making a call by reading said information stored in said memory means using said control channel, when a call request is detected by the detecting means; and
   second communication means for performing a communication with said another party's communication apparatus by said second communication function using said second information channel, after the call by the call means.

2. The apparatus according to claim 1, wherein the first communicating function is a facsimile communication function and the second communication function is a telephone function.

3. The apparatus according to claim 2, wherein said memory means stores a sending party's number, which is contained in ISDN incoming-call information, when a call is received.

4. The apparatus according to claim 2, wherein said memory means stores another party's dial number when a call is made.

5. The apparatus according to claim 1, further comprising selecting means for selecting either a first mode, in which a call is possible using said call means or a second mode in which a call is not possible using said call means,
   wherein said call means makes a call, based on said information stored in said memory means, when said selecting means selects the first mode.

6. A communication apparatus connected to an integrated service digital network having a first information channel, a second information channel, and a control channel, and having a first communication function and a second communication function, comprising:
   first communication means for performing communication with another party's communication apparatus by said first communication function using said first information channel;
   memory means for storing information indicative of a number for discriminating another party's communication apparatus when a call is received or a call is made by the first communication means;
   detecting means for detecting a call request by said second communication function during communication by the first communication means;
   call means for making a call, based on said information stored in said memory means, when a call request is detected by the detecting means; and
   selecting means for selecting either a first mode, in which a call is possible using said call means or a second mode, in which a call is not possible using said call means;
   wherein said call means makes a call, based on said information stored in said memory means, when said selecting means selects the first mode.

7. The apparatus according to claim 6, wherein the first communication function is a facsimile communication function and the second communication function is a telephone function.

8. The apparatus according to claim 6, wherein said apparatus has a handset, and said detecting means detects that the handset has been unhooked.

9. The apparatus according to claim 6, further comprising second communication means for performing a communication with said another party's communication apparatus, by said second communication function using said second information channel, after the call by the call means.

10. A communication apparatus connected to one subscriber's line of an integrated service digital network having a first information channel, a second information channel, and a control channel, and having a first communication function and a second communication function, comprising:
    a handset;
    first communication means for performing communication with another party's communication apparatus by said first communication function using said first information channel;

memory means for storing information indicative of a number for discriminating another party's communication apparatus when a call is received or a call is made by the first communication means;

detecting means for detecting a call request when said handset has been taken off a hook during communication by the first communication means;

call means for making a call by reading said information stored in said memory means using said control channel, when a call request is detected by the detecting means; and second communication means for performing a communication with said another party's communication apparatus by said second communication function using said second information channel, after the call by the call means.

11. A communication apparatus connected one subscriber's line of an integrated service digital network having a first information channel, a second information channel, and control channel, and having a first communication function and a second communication function, comprising:

a communication start switch;

first communication means for performing communication with another party's cmmunication apparatus by said first communication function using said first information channel;

memory means for storing information indicative of a number of discriminating another party's communication apparatus when a call is received or a call is made by the first communication means;

detecting means for detecting a call request by depression of said communication start switch during communication by the first communication means;

call means for making a call by reading said information stored in said memory means using said control channel, when a call request is detected by the detecting means; and second communication means for performing a communication with said another party's communication apparatus by said second communication function using said second information channel, after the call by the call means.

* * * * *

UNITED STATES PATENT AND TRADEMARK OFFICE
CERTIFICATE OF CORRECTION

PATENT NO. : 5,101,427
DATED : March 31, 1992
INVENTOR(S) : TAKASHI KOTANI, ET AL.

It is certified that error appears in the above-identified patent and that said Letters Patent is hereby corrected as shown below:

ON THE TITLE PAGE:
IN [57] ABSTRACT

Line 9, "fdacsimile" should read --facsimile--.

COLUMN 4

Line 24, "ten-key pad D3," should read --ten-key pad 73,--.

COLUMN 6

Line 36, "called" should read --call--.

COLUMN 11

Line 17, "connected one" should read --connected to one--.
Line 20, "and control" should read --and a control--.

COLUMN 12

Line 3, "cmmunication" should read --communication--.
Line 7, "of" should read --for--.

Signed and Sealed this

Twentieth Day of July, 1993

Attest:

MICHAEL K. KIRK

*Attesting Officer*   Acting Commissioner of Patents and Trademarks